(12) United States Patent
Xu et al.

(10) Patent No.: US 8,898,156 B2
(45) Date of Patent: Nov. 25, 2014

(54) QUERY EXPANSION FOR WEB SEARCH

(75) Inventors: Jun Xu, Beijing (CN); Hang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 391 days.

(21) Appl. No.: 13/040,192

(22) Filed: Mar. 3, 2011

(65) Prior Publication Data

US 2012/0226687 A1 Sep. 6, 2012

(51) Int. Cl.
*G06F 17/30* (2006.01)

(52) U.S. Cl.
CPC .... *G06F 17/30864* (2013.01); *G06F 17/30672* (2013.01)
USPC ............ 707/728; 707/736; 707/765; 707/715

(58) Field of Classification Search
USPC .......................... 707/728, 736, 765, 715, 749
See application file for complete search history.

(56) References Cited

U.S. PATENT DOCUMENTS

| | | | |
|---|---|---|---|
| 7,599,917 | B2 | 10/2009 | Meyerzon et al. |
| 7,685,119 | B2 * | 3/2010 | Riise et al. ............. 707/999.005 |
| 8,606,786 | B2 * | 12/2013 | Rounthwaite et al. ........ 707/737 |
| 2003/0212666 | A1 * | 11/2003 | Basu et al. ........................ 707/3 |
| 2005/0120311 | A1 | 6/2005 | Thrall |
| 2006/0253428 | A1 | 11/2006 | Katariya et al. |
| 2007/0255689 | A1 | 11/2007 | Sun et al. |
| 2009/0106221 | A1 | 4/2009 | Meyerzon et al. |
| 2010/0070506 | A1 * | 3/2010 | Whang et al. ................. 707/740 |

OTHER PUBLICATIONS

Agichtein, et al., "Improving Web Search Ranking by Incorporating user Behavior Information", Proceedings of the 29th Annual International ACM SIGIR Conference on Research and Development in Information Retrieval (SIGIR 2006), Aug. 2006, pp. 19-26.
Andoni, et al., "Near-optimal Hashing Algorithms for Approximate Nearest Neighbor in High Dimensions", Proceedings of the 47th Annual IEEE Symposium on Foundations of Computer Science (FOCS '06), Oct. 2006, pp. 459-468.
Baeza-Yates, et al., "Modern Information Retrieval", ACM Press, May 1999, 38 pages.
Beach, "Addressing Term Mismatch in Information Retrieval by Using Document Expansion", retrieved on Oct. 22, 2010 at <<http://cs.calvin.edu/curriculum/cs/396/private/projects/Beach2007.pdf>>, 2007, 7 pages.
Beeferman, et al., "Agglomerative Clustering of a Search Engine Query Log", Proceedings of the 6th ACM SIGKDD International Conference on Knowledge Discovery and Data Mining (KDD '00), Aug. 2000, pp. 407-416.

(Continued)

*Primary Examiner* — Belix M Ortiz Ditren
(74) *Attorney, Agent, or Firm* — Dan Choi; Judy Lee; Micky Minhas

(57) ABSTRACT

Systems, methods, and devices are described for retrieving query results based at least in part on a query and one or more similar queries. Upon receiving a query, one or more similar queries may be identified and/or calculated. In one embodiment, the similar queries may be determined based at least in part on click-through data corresponding to previously submitted queries. Information associated with the query and each of the similar queries may be retrieved, ranked, and or combined. The combined query results may then be re-ranked based at least in part on a responsiveness and/or relevance to the previously submitted query. The re-ranked query results may then be output to a user that submitted the original query.

20 Claims, 5 Drawing Sheets

(56) References Cited

OTHER PUBLICATIONS

Broder, et al., "Online Expansion of Rare Queries for Sponsored Search", Proceedings of the 18th International Conference on World Wide Web (WWW 2009), Apr. 2009, pp. 511-520.

Cover, et al., "Nearest Neighbor Pattern Classification", IEEE Transactions on Information Theory, vol. IT-13, No. 1, Jan. 1967, pp. 21-27.

Craswell, et al., "Random Walks on the Click Graph", Proceedings of the 30th Annual International ACM SIGIR Conference on Research and Development in Information Retrieval (SIGIR '07), Jul. 2007, pp. 239-246.

Cui, et al., "Probabilistic Query Expansion Using Query Logs", Proceedings of the 11th International Conference on World Wide Web (WWW 2002), May 2002, pp. 325-332.

Cui, et al., "Query Expansion by Mining user Logs", IEEE Transactions on Knowledge and Data Engineering, vol. 15, No. 4, Jul./Aug. 2003, pp. 829-839.

Cui, et al., "Query Expansion for Short Queries by Mining User Logs", retrieved Oct. 22, 2010 at <<http://citeseerx.ist.psu.edu/viewdoc/download?doi=10.1.1.10.5627&rep=rep1&type=pdf>>, 2002, 35 pages.

Deerwester, et al., "Indexing by Latent Semantic Analysis", Journal of the American Society for Information Science, vol. 41, No. 6, Sep. 1990, pp. 391-407.

Downey, et al., "Heads and Tails: Studies of Web Search with Common and Rare Queries", Proceedings of the 30th Annual International ACM SIGIR Conference on Research and Development in Information Retrieval (SIGIR '07), Jul. 2007, pp. 847-848.

Dudani, "The Distance-Weighted k-Nearest-Neighbor Rule", IEEE Transactions on Systems, Man, and Cybernetics, Apr. 1976, pp. 325-327.

Geng, et al., "Query Dependent Ranking using K-Nearest Neighbor", Proceedings of the 31st Annual International ACM SIGIR Conference on Research and Development in Information Retrieval (SIGIR '08), Jul. 2008, pp. 115-122.

Herbrich, et al., "Large Margin Rank Boundaries for Ordinal Regression", Chapter 7 in "Advances in Large Margin Classifiers", MIT Press, Cambridge, MA, Jan. 2000, pp. 115-132.

Hofmann, "Probabilistic Latent Semantic Indexing", Proceedings of the 22nd Annual International ACM SIGIR Conference on Research and Development in Information Retrieval (SIGIR '99), Aug. 1999, pp. 50-57.

Jarvelin, et al., "IR Evaluation Methods for Retrieving Highly Relevant Documents", Proceedings of the 23nd Annual International ACM SIGIR Conference on Research and Development in Information Retrieval (SIGIR '00), Jul. 2000, pp. 41-48.

Joachims, "Optimizing Search Engines Using Clickthrough Data", Proceedings of the 8th ACM SIGKDD International Conference on Knowledge Discovery and Data Mining (KDD 02), Jul. 2002, pp. 133-142.

Liu, "Learning to Rank for Information Retrieval", retrieved on Oct. 22, 2010 at <<http://www2009.org/pdf/T7A-LEARNING%20TO%20RANK%20TUTORIAL.pdf>>, Microsoft Research Asia, Apr. 12, 2009, 67 pages.

Mitra, et al., "Improving Automatic Query Expansion", Proceedings of the 21st Annual International ACM SIGIR Conference on Research and Development in Information Retrieval (SIGIR '98), Aug. 1998, pp. 206-214.

Ponte, et al., "A Language Modeling Approach to Information Retrieval", Proceedings of the 21st Annual International ACM SIGIR Conference on Research and Development in Information Retrieval (SIGIR '98), Aug. 1998, pp. 275-281.

Robertson, et al., "Okapi at TREC-3 ", NIST Special Publication 500-226: Overview of the Third Text REtrieval Conference (TREC-3), Nov. 1994, pp. 109-126.

Robertson, et al., "The TREC-9 Filtering Track Final Report", NIST Special Publication 500-249: The Ninth Text REtrieval Conference (TREC 9), Nov. 2000, pp. 25-40.

Salton, et al., "A Vector Space Model for Automatic Indexing", Communications of the ACM, vol. 18, No. 11, Nov. 1975, pp. 613-620.

Salton, et al., "Improving Retrieval Performance by Relevance Feedback", Journal of the American Society for Information Science, vol. 41, No. 4, Jun. 1990, pp. 288-297.

Salton, et al., "Introduction to Modern Information Retrieval", McGraw-Hill Book Company, New York, NY, USA, 1986, pp. 201-215 + cover page.

Scholkopf, et al. "Learning With Kernels: Support Vector Machines, Regularization, Optimization, and Beyond", MIT Press, Cambridge, Massachusetts, 2002, 648 pages.

Wen, et al., "Query Clustering Using User Logs", ACM Transactions on Information Systems, vol. 20, No. 1, Jan. 2002, pp. 59-81.

Xu, et al., "AdaRank: A Boosting Algorithm for Information Retrieval", Proceedings of the 30th Annual International ACM SIGIR Conference on Research and Development in Information Retrieval (SIGIR '07), Jul. 2007, pp. 391-398.

Xu, et al., "Query Expansion using Local and Global Document Analysis", Proceedings of the 19th Annual International ACM SIGIR Conference on Research and Development in Information Retrieval (SIGIR '96), Aug. 1996, pp. 4-11.

Xue, et al., "Optimizing Web Search Using Web Click-through Data", Proceedings of the 13th ACM International Conference on Information and Knowledge Management (CIKM '04), Nov. 2004, pp. 118-126.

Zhai, et al., "A Study of Smoothing Methods for Language Models Applied to Information Retrieval", ACM Transactions on Information Systems, vol. 22, No. 2, Apr. 2004, pp. 179-214.

Zhao, et al., "Adapting Document Ranking to Users' Preferences Using Click-through Data", Microsoft Research TechReport, No. MSR-TR-2006-15, Feb. 2006, 17 pages.

Zhuang, et al., "Re-ranking Search Results Using Query Logs", Proceedings of the 15th ACM International Conference on Information and Knowledge Management (ACM CIKM '06), Nov. 2006, pp. 860-861.

* cited by examiner

QUERY EXPANSION FOR WEB SEARCH

BACKGROUND

Traditional models for information retrieval (IR), such as the Vector Space Model and Language Models for IR, for example, tend to be based on term matching. More particularly, such models identify information in response to a query by calculating the relevance of a document with respect to the query based on the terms and/or words shared by the query and the document. However, since the user who submits the query and the author(s) of the document often use different terms and/or words to describe the same or similar concepts, various IR methods may suffer from term mismatch. That is, documents that are otherwise responsive to the query may not be identified due to differences in expression, including typographical errors, the use of acronyms and/or synonyms, etc. As a result, because one or more documents and a query are relevant but do not share any term, documents that are relevant and responsive to the submitted query may not be returned to the user.

Term mismatch may also occur in web search. For instance, there may be tens, if not hundreds, of different queries that represent a single search intent, such as "things to do in New York." Accordingly, a particular query entered by the user may return some, but not all, of the documents relating to this search intent. Query expansion, by expanding the scope of a search by adding terms to a query, may be effective for conventional IR methods. Since various IR methods retrieve documents containing any one of the query terms, adding new terms to a query may result in additional documents being retrieved. However, in web search, adding terms to a search query may cause a search engine to only return documents or websites that contain each of the terms included in the query. Therefore, query expansion in the context of web search may actually cause the search engine to retrieve fewer documents, which would not improve the relevance of the search results.

SUMMARY

Described herein are techniques for generating search results based on a search query and one or more similar search queries. More particularly, described herein is a system that receives a search query as a request for information. Moreover, one or more queries similar to the search query may be identified in a repository and/or calculated based at least in part on a plurality of click-through data. Information (i.e., search results) associated with the search query and each of the similar queries may be retrieved and ranked. Further, the search results may be combined and re-ranked according to a ranking model or based on a relevance of each search result to the search query. Following the re-ranking, the combined and re-ranked search results may then be output to a user that submitted the query.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
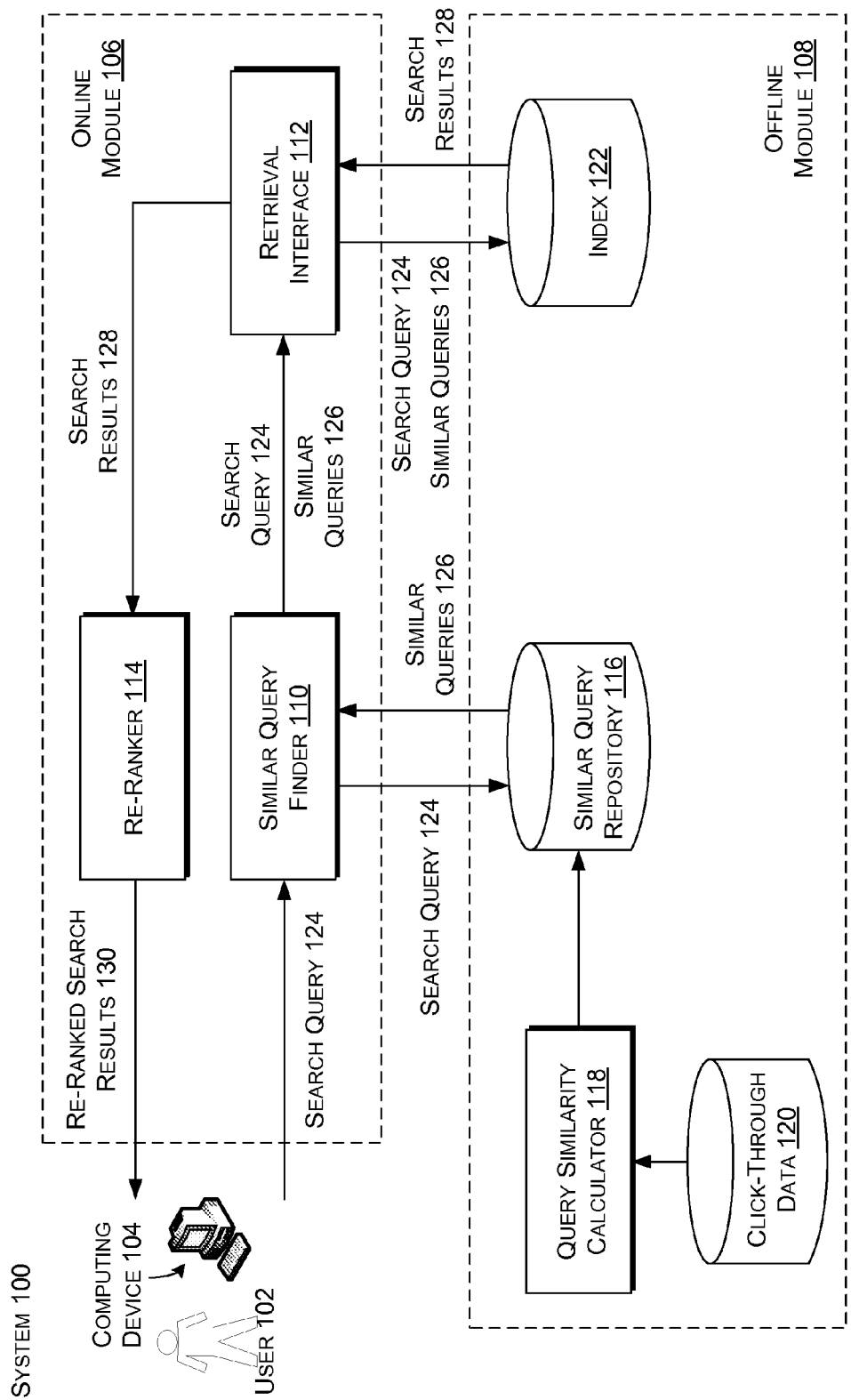
FIG. 1 illustrates a diagram showing a system for returning search results based on a search query and one or more similar queries, in accordance with various embodiments.

Described herein are systems and/or techniques to provide a query expansion approach to avoiding possible term mismatch that may occur during a web search and ultimately limit comprehensiveness of search results. As mentioned previously, term mismatch occurs when a web document and a search query are relevant but do not share any term. As a result, documents that are relevant and otherwise responsive to a particular query may not be returned to a user. This is because different expressions can represent the same concept and the same expression can represent many different concepts. For instance, if the user includes the term "NYC" in a search query while a document instead uses the term "New York City", then this document may not be retrieved or ranked highly in the search system because the search query and this document do not share common terms. That is, if one of the terms is used in the search query and the other term is used in the web document, then a mismatch may occur. However, since the term "NYC" is an acronym for "New York City", this document would likely be of interest to the user. For the purposes of this discussion, "query" and "search query" may be used interchangeably and may refer to one or more terms, words, characters, and/or numbers used to search for information.

As shown in the example above, the authors of documents and the users of web search may often use different terms to describe the same, or similar, concepts. The application of query expansion to conventional information retrieval (IR) methods may address term mismatch. In conventional IR, a query may be adjusted by adding new terms to the query. As a result, a search utilizing the expanded query (i.e., query expansion) may cause additional documents to be returned to a user. More particularly, because conventional IR adopts the "OR" logic, IR methods may return documents that contain any one of the terms included in the query. For instance, a query including the terms "NYC" and "New York City" would likely return documents that also include "NYC" or "New York City" somewhere in the document. Therefore, by adding new terms to the query, conventional IR methods may retrieve more documents and, thus, cope with term mismatch by increasing the number of documents that are returned.

On the other hand, modern web search engines often index a large number of web documents and responds to a large number of search requests in a short time. Accordingly, web search engines frequently adopt the "AND" logic to interpret queries when retrieving web documents. That is, only those web documents that include each of the terms in the search query would be returned to a user. Moreover, even if web documents that did not include each of these terms were also returned, the web documents that included each of the query terms would likely be returned first. Therefore, a straightforward application of conventional query expansion methods to web search would likely cause a search engine to retrieve and return fewer documents. Further, web documents that are relevant to the query but did not include each of the query terms may not be returned to the user. Consequently, web documents that may be of interest to the user would not be returned, which may result in a diminished accuracy of the web search methods described above. For the purposes of this discussion, web documents may include any information that may be retrieved over the Internet, however, documents may be retrieved from any repository of documents, electronic mail, or other data.

As stated above, adding new terms to a search query may not improve the accuracy and relevancy associated with a web search. However, in one embodiment, instead of adding new terms to a search query, one or more additional queries that are similar to the original query may be issued. By issuing additional queries having similar search intents, a search engine may return relevant web documents that are not responsive to the original query and, therefore, would not have otherwise been returned. In particular, as the similar queries may contain semantically similar, but different, expressions, the relevant while mismatched documents that may not be returned by the original query may be retrieved in response to the similar queries. In various embodiments, a similar query repository that stores the similar queries may be created based at least in part on click-through data. Furthermore, the additional queries may be considered similar to the original query if the queries have similar search intents.

When a search query is received, the system described herein may identify queries similar to the original search query and both the original search query and its similar queries may be searched. Subsequently, results responsive to the original search query and the similar queries may be ranked and then combined. With the addition of the similar queries, the set of search results may be more diverse and contain more relevant web documents. Furthermore, since the search results are retrieved by different queries, the combined search results may then be re-ranked with a re-ranking model. Re-ranking the combined search results may identify which web documents are more and/or less relevant in view of the original query.

Various examples of query expansion techniques, in accordance with the embodiments, are described below with reference to FIGS. 1-5.

FIG. 1 illustrates a diagram representing a system 100 for providing relevant documents in response a search query. More particularly, the system 100 may include a user 102, an online module 106, and an offline module 108. For the purposes of this discussion, the user 102 may be any individual at a computing device 104, as shown in additional detail in FIG. 5. In various embodiments, the online module 106 may include a similar query finder 110, a retrieval interface 112, and a re-ranker 114. Furthermore, the offline module 108 may include a similar query repository 116, a query similarity calculator 118, click-through data 120, and an index 122. In one embodiment, the online module 106 may receive user queries and present retrieval results to the user 102 while the offline module 108 is directed to the offline processing of various click-through data 120 and creating a repository 116 of queries that are similar to the received user queries. Additionally, the online module 106 and/or the offline module 108 may implemented on or across one or more computing devices 104, servers, or other storage mechanisms known in the art.

In an example embodiment, the user 102 may want to identify information of interest to the user 102. For example, the user 102 may be traveling to New York and may want to locate information relating to things to do in New York. Accordingly, the user 102 may submit a search query 124 to the similar query finder 110 of the online module 106. The search query 124 may include any term(s) desired by the user 104, such as "New York". In this embodiment, the online module 106 may receive the search query 124 as input and the similar query finder 110 may determine whether there are any additional queries (i.e., similar queries 126) that are different but similar to the search query 124. More particularly, the similar query finder 110 may determine whether any similar queries 126 are stored in the similar query repository 116. If so, the similar queries 126 may be retrieved from the similar query repository 116 and transmitted to the similar query finder 110.

In various embodiments, the similar queries 126 may be generated using any technique known in the art. For example, the query similarity calculator 118 may, given a set of click-through data 120, compute the similar queries 126 for some or all of the search queries 124 associated with the click-through data 120. In these embodiments, the similar queries 126 may be calculated based at least in part on the click-through data 120. Once the similar queries 126 are computed by the query similarity calculator 118, the similar queries 126 may be stored in the similar query repository 116. That is, after the similar queries 126 have been computed, the similar queries 126 may be merged and stored in the similar query repository 116 for future use. Therefore, given a new search query 124, queries (i.e., similar queries 126) similar to the new search query 124 may be identified in and retrieved from the similar query repository 116 without having to calculate additional similar queries 126. As a result, the click-through data 120 can but need not be searched again.

In various embodiments, the click-through data 120 may correspond to URLs that are both retrieved and selected by a user in response to a search query 124. For instance, over time the system 100 may receive multiple search queries 124 and, for each of the search queries 124, provide URLs that may be relevant and/or responsive to the search queries 124. Upon receiving the URLs, the user 102 may decide whether to select each URL. If a user selects a particular URL, that URL may be deemed to be responsive and/or relevant to the corresponding search query 124. Therefore, the click-through data 120 may be determined by recording the number of clicks/selections on the URLs for each of the search queries 124 searched at the system 100. Moreover, the click-through data 120 may represent implicit feedback from the user 102 and, therefore, may be useful for determining which additional queries are similar to a particular search query 124. Accordingly, since query similarity is calculated on the basis of selections (clicks) by web search users, such as the user 102, queries with different representations but similar search intents may be considered as similar. For example, "aircraft" and "airplane" refer to the same concept but may be represented by different terms. As a result, if one of these terms was the search query 124, the other term may constitute a similarly query 126.

In various embodiments, once the similar queries 126 are identified by the similarity query finder 110 and/or the query similarity calculator 118, the search query 124 and the similar queries 126 may be issued to the retrieval interface 112. For each of the search query 124 and the one or more similar queries 126, the retrieval interface 112 may retrieve a set of matched documents (i.e., search results 128) from the index 122 and rank them according to a basic ranking model. In this embodiment, the index 122 may store web documents, URLs, and/or other information that may be responsive to any search query 124 or similar query 126. Moreover, the basic ranking model may rank the web documents within the search results 128 based on their respective relevancy and/or responsiveness to the search query 124 and/or the similar queries 126.

That is, as shown in FIG. 1, the search query 124 and the similar queries 126 may be transmitted to the retrieval interface 112, which may then access the index 122 for the purpose of identifying information relevant and/or responsive to the search query 124 and each of the similar queries 126. Subsequently, the index 122 may identify the search results 128 (i.e., web documents, URLs, etc.) that are relevant and/or responsive to the search query 124 and each of the similar queries 126. The search results 128 may include information responsive to the search query 124 and information responsive to each of the similar queries 126. The search results 128 may then be transmitted back to the retrieval interface 112. Once the search results 128 are retrieved by the retrieval interface 112, the retrieval interface 112 may then send the search results 128 to the re-ranker 114. In this embodiment, the re-ranker 114 may receive and combine the search results 128 associated with the search query 124 and each of the similar queries 126. Once the search results 128 are combined, the re-ranker 114 may re-rank the search results 128 according to their respective relevancy and/or responsiveness to the search query 124. The combined and re-ranked search results 130 may then be presented to the user 102 in any manner known in the art.

Accordingly, the re-ranked search results 130 received by the user 102 may be relevant and/or responsive to the search query 124 initially submitted by the user 102. Further, because the re-ranked search results 130 were identified based on both the search query 124 and the similar queries 126, the mismatched and relevant web documents that would not have been identified solely in response to the submitted search query 124 may be retrieved and ranked in the re-ranked search results 130. As a result, the user 102 will receive additional web documents that are likely to be of interest to the user 102.

In various embodiments, and as mentioned previously, the query similarity calculator 118 may calculate similarities between the search query 124 and other search queries. It is contemplated that the query similarity calculator 118 may employ any method to identify and/or compute the similar queries 126. For instance, as shown in FIG. 1, the query similarity calculator 118 may use the click-through data 120.

In various embodiments, the click-through data 120 may include four tuples (q, r, u, c), where q denotes a search query 124 submitted to the system 100, u denotes URLs responsive to that search query 124, r denotes ranking of URLs, and c represents user clicks on the URLs. For instance, assume for the sake of this discussion that the user 102 submitted the search query 124 "New York." In response to submitting this search query 124, the system 100 may generate a ranked list of URLs that may be responsive and/or relevant to the search query 124 "New York." Once the URLs are displayed to the user 102, the user 102 may elect to select one, some, all, or none of the listed URLs. Based on the URLs that are selected by the user 102, the system 100 may determine the click-through data 120 for the search queries 124 submitted to the system 100. In various embodiments, each time a search is conducted at the system 100, the click-through data 120 may be recorded. Accordingly, as the number of search queries 124 increase, the amount of click-through data 120 may also increase.

The click-through data 120 may be an accurate measure of which URLs are actually relevant to a submitted search query 124. For instance, it is contemplated that upon returning a list of ranked URLs to a user 102, the user 102 will likely not select the URLs at random. On the contrary, the user 102 will more likely select URLs that he/she believes are relevant to the search query 124. Therefore, the URLs that are actually selected by the user 102 may be an indication of information that is relevant and/or responsive to a particular search query 124. That is, the click-through data 120 may represent implicit feedback from the user 102.

In one embodiment, in order to calculate query similarity, the search query 124 and the click-through data 120 may be represented in a bipartite graph. A bipartite graph may correspond to a graph whose vertices can be divided into two disjoint sets such that every edge connects a vertex in the first set to a vertex in the second set. For instance, assuming that the bipartite graph had two disjoint sets of U and V, each edge in the bipartite graph may connect a vertex in U to a vertex in V. That is, U and V may be independent sets. In the bipartite graph described above, search queries 124 and URLs identified in response to the search queries 124 may be nodes on two sets and edges between the nodes in the two sets. Moreover, a weight may be associated with each edge that represents a total number of times that each URL is selected after the corresponding search query 124 is issued.

More particularly, query similarity may be defined by using co-selected URLs in the click-through bipartite graph. In general, if two different search queries 124 have shared URLs, then the two search queries 124 will likely be regarded as being similar. In other words, assume that a first group of URLs are identified in response to a first search query 124 and that a second group of URLs are identified in response to a second search query 124. If one or more of the URLs in the first group are the same as the URLs in the second group, the first search query 124 and the second search query 124 may be considered similar. Moreover, since search queries 124 with the same, or similar, search intent may tend to be linked to the same set of URLs, defining query similarity between search queries 124 based on shared URLs may also represent a degree to which the search queries 124 have the same search intent. For instance, there may be a higher likelihood that search queries 124 having multiple shared URLs have the same search intent as opposed to search queries in which fewer URLs are shared.

In various embodiments, query similarity, which may be denoted as $s_Q(q,q')$, may be calculated as a Pearson Correlation Coefficient between the selected URLs of two different search queries 124, as shown in Equation 1:

$$s_Q(q, q') = \frac{\sum_{i=1}^{n} (u_i - \bar{u})(v_i - \bar{v})}{\sqrt{\sum_{i=1}^{n} (u_i - \bar{u})^2} \sqrt{\sum_{i=1}^{n} (v_i - \bar{v})^2}}, \quad (1)$$

In this embodiment, $u_i$ and $v_i$ may denote the number of clicks on URL i by query q and query q', respectively. Moreover, $\bar{u}$ and $\bar{v}$ may denote the average numbers of clicks of query q and query q', respectively, and n may denote the total number of clicked URLs by query q and query q'. Furthermore, although the Pearson Correlation Coefficient is shown below, it is contemplated that any measure known in the art may be used to determine query similarity.

In $s_Q$, two search queries 124 may be considered similar if they share a predetermined number of URLs in the click-through bipartite graph. It is contemplated that the predetermined number may be any number. These two search queries 124 may be regarded as similar because search queries 124 with the same search intent tend to be linked to the same set, or a similar set, of URLs. Further, utilizing the determined $s_Q$, a predetermined number of similar search query 124 pairs may be mined from the click-through data 120. From these search query 124 pairs, valuable information relating to query expansion may be determined, such as, for example, spelling error correction (e.g., "New York" vs. "Nu York"), word breaking ("iron-man" vs. "iron man"), stemming (e.g., "knives" vs. "knifes" and "knife"), synonyms (e.g., "aircraft for sale" vs. "airplanes for sale"), acronym expansion (e.g., "UCSD" vs. "University of California San Diego), etc. Therefore, by identifying queries similar to the search query 124, similar queries 126 that generate the same or similar search results 128 may be identified and used to improve returning relevant and responsive information to the user 102.

Accordingly, the query similarity calculator 118 may identify queries similar to the search query 124 and store the similar queries 126 in the similar query repository 116. When the system 100 receives a search query 124, the similar query finder 110 may identify the similar queries 126 from the similar query repository 116. The similar queries 126 may be computed by the similarity query calculator 118 and may be computed using the click-through data 120. As mentioned previously, once identified by the similar query finder 110, the search query 124 and the similar queries 126 may be issued to the index 122 by way of the retrieval interface 112. In response, the index 122 may identify one or more search results 128 that are relevant and/or responsive to the search query 124 and each of the similar queries 126.

Compared with convention query expansion techniques (e.g., adding terms to a query), issuing multiple queries similar to an original submitted search query 124 may increase the responsiveness and/or relevance of the corresponding search results 128. For instance, the retrieved search results 128 not only contain the web documents matched with the original search query 124, but may also include the web documents identified in response to each of the similar queries 126. Moreover, the web documents resulting from the similar queries 126 may include mismatched relevant documents that may not have been returned solely in response to the originally submitted search query 124. In this embodiment, the relevant mismatched documents may be included in the re-ranked search results 130.

In addition, issuing multiple queries to a web search engine may include minimal changes, if any, to the web search engine. Since a web search engine is a complex system with many components, implementing the "AND" logic in attempt to address term mismatch may require significant changes to the web search engine. For instance, any changes to the core components, especially the to the document index, of the web search engine may greatly impact the retrieval capabilities and performance of the web search engine in terms of both search relevance and response time. Therefore, by issuing multiple queries to the web search engine, the core components of the web search engine may remain unchanged. Furthermore, the web search engine having the same core components may return search results 128 to both the search query 124 and to each of the similar queries 126.

Further still, increasing the number of queries submitted to a web search engine may also not modify the previously submitted search query 124. When adding terms to a search query 124, the search query 124 may sometimes experience query drift. That is, the search intent of the new search query 124 (i.e., the original search query 124 with the additional terms) may be different from the original search intent. For example, the search intent of the search query 124 "New York" may be very different from the search intent of "New York basketball." Moreover, although the search intent of the similar queries 126 may be different than the search intent of the original search query 124, it is contemplated that the search results 128 of the original search query 124 is kept and combined with the search results 128 associated with the similar queries 126. Therefore, since the search results 128 for both the search query 124 and the similar queries 126 are combined and re-ranked, query drift may be negligible.

In an example embodiment, once the search results 128 corresponding to the search query 124 and the similar queries 126 have been identified, the multiple search results 128 may be combined and duplicate URLs may be removed. The combined search results 128 may then be re-ranked. More particularly, the combined search results 128 may be re-ranked based on relevance and/or responsiveness to the original search query 124. Moreover, the combined search results 128 may also be re-ranked utilizing a re-ranking model, such as a linear combination model, for example.

In one embodiment, given a user query q (i.e., the search query 124) and a retrieved document d, the re-ranking model f(q,d) may calculate the relevance of d with respect to q. Further, assume for the sake of this discussion that $N_q$ is a set of queries similar to the user query q, and $N_d$ is the set of documents that are retrieved in response to the similar queries 126. Further suppose that r(q,d) is a basic ranking function of q and d, such as the ranking function utilized in a web search engine. The re-ranking model may be defined as Equation 2:

$$f(q, d) = \alpha_0 r(q, d) + \sum_{(q',d') \in P} \alpha_{(q',d')} s_Q(q, q') s_D(d, d') r(q', d'), \quad (2)$$

where $s_D(\cdot,\cdot) \geq 0$ may denote the document similarity function, where $P=\{(q',d')|(q' \in N_q) \wedge (d' \in N_d) \wedge (q'\text{retrieved}')\}$ may stand for a set of similar query-document pairs, and $\alpha_0$ and $\alpha_{(q',d')}$ may denote weights for combination associated with the document pairs. If user query q does not have any similar queries 126 available in the similar query repository 116, the re-ranking model may degenerate to the basic ranking model r(q,d).

Figure 2:
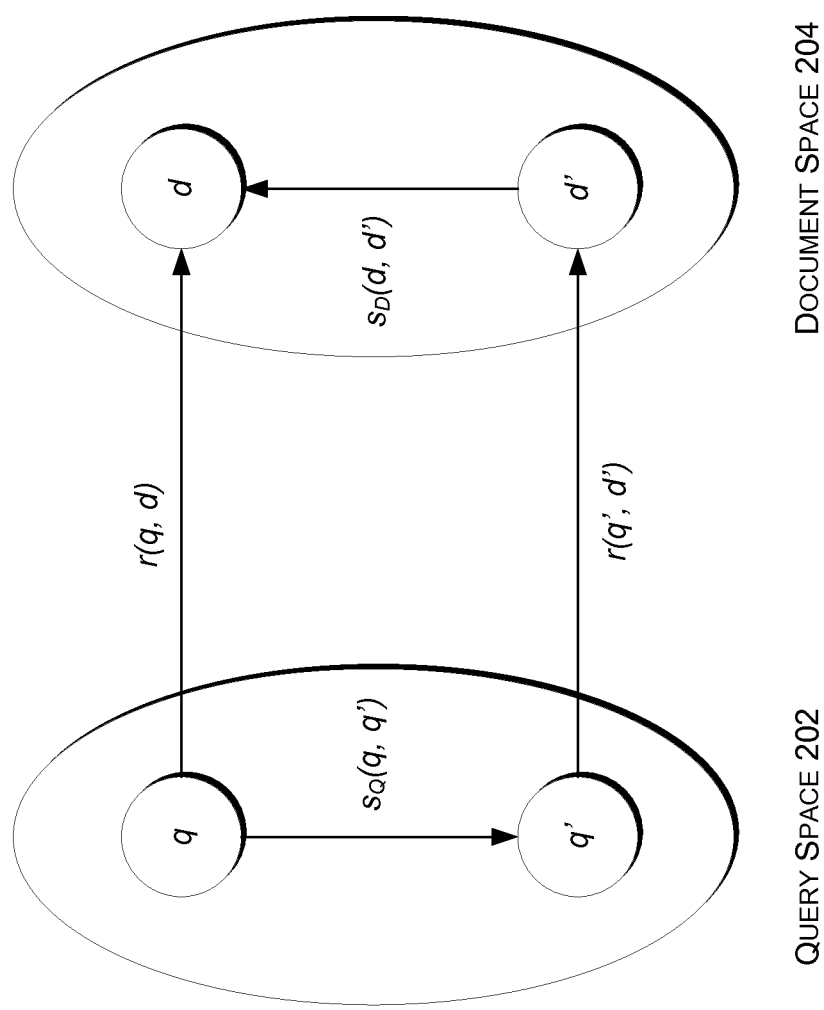
FIG. 2 illustrates a diagram showing a model for re-ranking search results in response to a search query and one or more similar queries, in accordance with various embodiments.

The foregoing re-ranking model may also be illustrated in FIG. 2, which illustrates a query space 202 and a document space 204. The query space 202 may include user query q and one or more similar queries q' (i.e., the similar queries 126). In various embodiments, the re-ranking model may correspond to the re-ranker 114, as illustrated in FIG. 1. Moreover, the document space 204 may include retrieved document d and similar document(s) d'. In addition, $s_Q(q, q')$ may represent the similarities between query q and similar queries q', r(q, d) may represent the documents d identified in response to query q, r(q', d') may represent the documents d identified in response to similar queries d', and $s_D(d, d')$ may represent the combined documents d and d' identified in response to query q and to each of similar queries q'.

FIG. 2 shows a re-ranking model that may address term mismatch by using the similar queries 126 and web documents and/or other information retrieved by the similar queries 126. More particularly, the re-ranking model may determine a ranking score of each search query 124, such as query q (i.e., the search query 124), and its corresponding retrieved documents, such as document d, not only based on query q and document d, but also based on similar queries $N_q$ (i.e., the similar queries 126) and documents $N_d$. That is, if for some reason a ranking score cannot be determined for query q and document d, the ranking scores of their neighbors (e.g., similar queries $N_q$ and documents $N_d$) may be used to determine the ranking score of query q and document d. For instance, as shown in FIG. 2, the matching between q and d may also be conducted from q to q', from q' to d', and then from d' to d. In other words, whereas conventional ranking models use point to point matching, the linear combination model described herein instead may use subset to subset matching.

As an example, assuming that q is "NY" and d is a document about "New York," then the score between q and d by the ranking model will likely be low. Moreover, if q' is "New York," and it is known that q and q' are similar, and r(q',d) should have a relatively high ranking score, then r(q',d) may be used to boost the ranking score of r(q,d).

In the linear combination model described above, the weight $\alpha_0$ may be determined in a variety of ways including, for example, by utilizing uniform weights, heuristics weights, and/or learning weights. As stated above, uniform weights may be set (e.g., 1) to each $\alpha_{(q',d')}$. In this embodiment, the re-ranking model may be expressed as shown in Equation 3:

$$f(q, d) = \alpha_0 r(q, d) + \sum_{(q',d') \in P} s_Q(q, q') s_D(d, d') r(q', d'). \quad (3)$$

Figure 3:
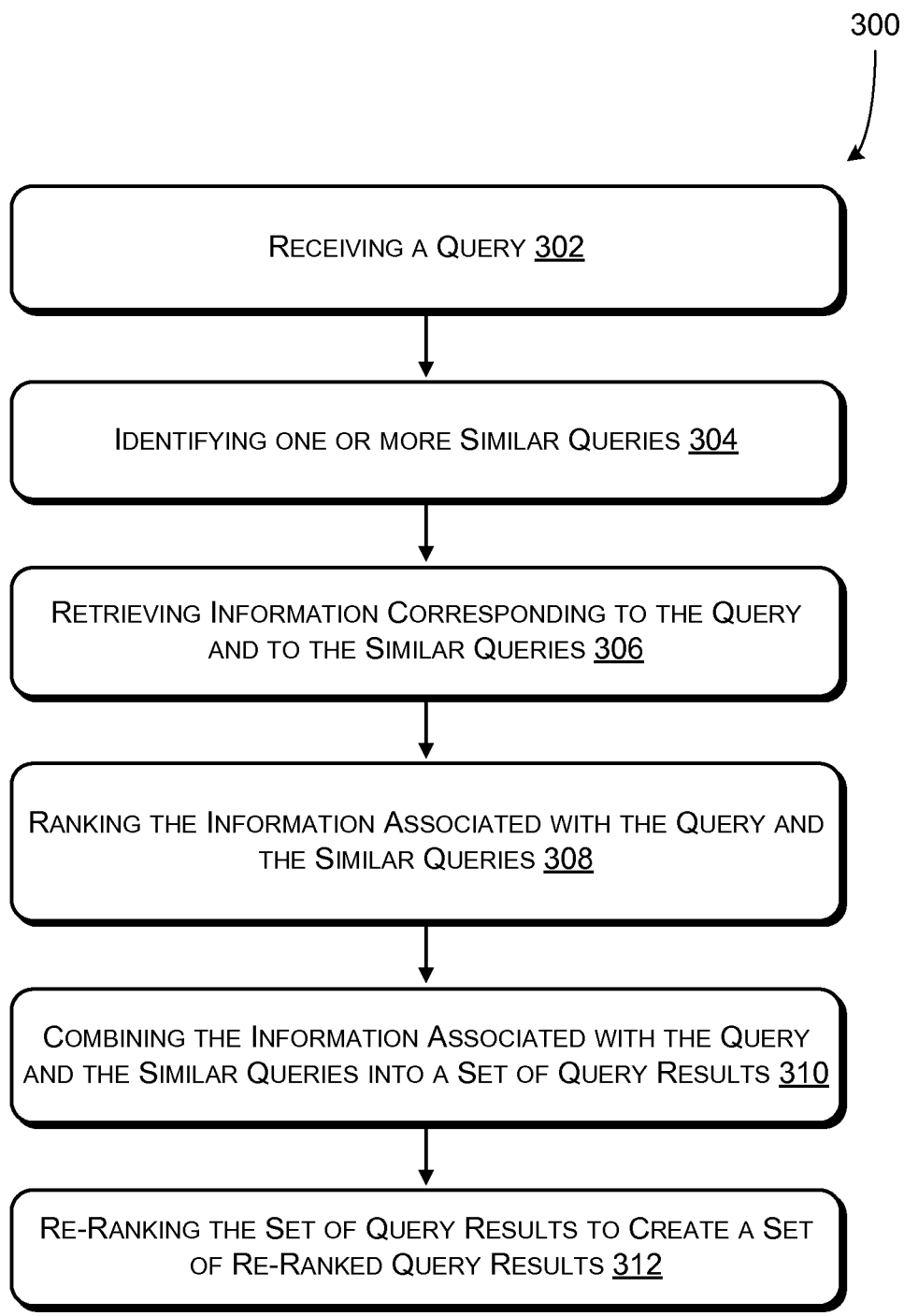
FIG. 3 illustrates a flowchart showing an illustrative process to provide search results based on a search query and one or more similar queries.

With respect to the uniform weights, and as shown in FIG. 3, the basic ranking scores r(q',d') may be weighted by the product of query similarity and document similarity.

In other embodiments, heuristics weights may be utilized to estimate the weights $\alpha(q',d')$ using the click-through data 120. That is, the click-through data 120 may be used as supervision information to achieve a better weighting of the basic ranking scores r(q',d'). More specifically, for each query $q_i$, a list of document preference pairs $(d_i^+, d_i^-)$ may be generated from the click-through data 120, where $d_i^+$ and $d_i^-$ indicate that document $d_i^+$ is more preferred than $d_i^-$, with respect to query $q_i$. Moreover, $\{(q_i, d_i^+, d_i^-, N_i)\}_{i=1}^M$ may be used to denote the set of preference pairs derived from the whole set of click-through data 120, where M is the number of preference pairs, and $N_i$ is the number of occurrence of preference pair $(d_i^+, d_i^-)$ with respect to query $q_i$. Therefore, utilizing heuristic weights, the re-ranking model may be rewritten as shown in Equation 4:

$$f(q, d) = \alpha_0 r(q, d) + \sum_{i: q_i \in N_q} \alpha_i \cdot s_Q(q, q_i) \cdot [r(q_i, d_i^+) s_D(d, d_i^+) - r(q_i, d_i^-) s_D(d, d_i^-)], \quad (4)$$

Moreover, the weight $\alpha_i$ for preference pair $(q_i, d_i^+, d_i^-, N_i)$ may be calculated as shown in Equation 5:

$$\alpha_i = \frac{N_i}{\sum_{q_j: (q_j \in N_q) \wedge (s_D(d,d_j^+) > 0 \vee s_D(d,d_j^-) > 0)} N_j}. \quad (5)$$

The weights $\alpha_i$ may also be determined with a learning method, such as by utilizing a Support Vector Machine (SVM). For the purposes of this discussion, a SVM may refer to a set of related supervised learning methods that analyze data and recognize patterns used for classification and regression analysis. In various embodiments, the SVM technique may be employed to automatically learn the weights with preference pairs as training data. Further, the optimization problem as shown in Equation 6 may be solved in the following manner:

$$\operatorname*{argmin}_{f(q,d) \in H_{\tilde{k}}} \sum_{i=1}^{N} [1 - (f(q_i, d_i^+) - f(q_i, d_i^-))]_+ + C \cdot \|f(q, d)\|_{H_{\tilde{k}}}^2, \quad (6)$$

Where $[\bullet]_+ = \max(0, \bullet)$ is the hinge loss function, C is a parameter, $H_{\tilde{k}}$ is the Hilbert space defined by the kernel $\tilde{k}$, and N is the number of preference pairs. Moreover, kernel $\tilde{k}$ may be defined as shown in Equation 7:

$$\tilde{k}((q,d),(q',d'))=r(q,d)s_Q(q,q')s_D(d,d')r(q'd'). \quad (7)$$

Furthermore, it may be determined that $\tilde{k}$ is a kernel function if $s_D$ and $s_Q$ are positive semi-definite kernels. More particularly, if $\tilde{k}$ is a positive semi-definite kernel (i.e., $s_D$ and $s_Q$ are positive semi-definite kernels), the solution to Equation 6 is the following:

$$f^*(q, d) = \qquad (8)$$
$$\sum_{i=1}^{M} \theta_i [r(q_i, d_i^+) s_D(d_i^+, d) - r(q_i, d_i^-) s_D(d_i^-, d)] \cdot s_Q(q, q_i) r(q, d).$$

Moreover, the optimization problem shown above in Equation 5 may be solved by solving the dual problem described in Equation 9 below:

$$\operatorname*{argmax}_{\theta} \sum_{i=1}^{M} \theta_i - \frac{1}{2} \sum_{i=1}^{M} \sum_{j=1}^{M} \theta_i \theta_j W(i, j) \text{ s.t. } 0 \le \theta_i \le \frac{1}{2C}, \quad (9)$$

where W(i, j) may be defined in Equation 10:

$$s_Q(q',q_j) \cdot [s_D(d_i^+, d_j^+) r(q_i, d_i^+) r(q_j, d_j^+) - s_D(d_i^+, d_j^-) r(q_i, d_i^+) r(q_j, d_j^-) - s_D(d_i^-, d_j^+) r(q_i, d_i^-) r(q_j, d_j^+) + s_D(d_i^-, d_j^-) r(q_i, d_i^-) r(q_j, d_j^-)]. \quad (10)$$

In various embodiments, an online search algorithm may be utilized by the online module 106, as shown in FIG. 1, to retrieve and re-rank the search results 128. For example, the online search algorithm is described below:

Input: query q; parameter k.
Retrieve k queries Q' similar to q using $s_Q(q,q')$.
For each q'∈Q'
    Retrieve documents D' according to r(q',d').
    Add the retrieved documents D' to D.
End For
Determine $s_D(d,d')$ for d,d'∈D.
Determine α (uniform weighting or heuristic weighting).
Calculate f (q,d) for d∈D.
Output: ranked documents in D w.r.t. f (q,d).

As shown above, given query q, the algorithm may first find the top k similar queries Q' from the similar query repository 116. Subsequently, document set D may be created by merging the search results 128 retrieved by query q and all q'∈Q'. The basic ranking scores r(q,d) between all of the retrieved query-document pairs may also be returned. Then, the document similarities may be calculated, the combination parameters may be determined, and the final ranking scores f (q,d) may be calculated. The retrieved documents may then be ranked with the re-ranking model f(q,d) and returned to the user 102.

Furthermore, the approaches described herein may also be considered a weighted k-nearest-neighbor (KNN) model applied to both the query space 202 and the document space 204, as shown in FIG. 2. For the purposes of this discussion, a KNN algorithm may be considered a machine learning method for classification and regression analysis. Specifically, given an instance, the KNN algorithm may determine its label or value by making majority voting from its k nearest neighboring instances in a metric space. Moreover, the voting strategy in KNN may be represented by a linear combination model and the weights of the linear combination may be represented by a predetermined distance.

More particularly, the re-ranking model f (q,d) may include two parts. The first part may be the direct matching score by the basic ranking model r(q,d). Moreover, the second part may be a linear combination of matching scores r(q',d') between the similar queries 126 and documents, which may actually be a KNN model over the query space 202 and the document space 204, as illustrated in FIG. 2. Moreover, given a query q and document d, the systems and/or methods described herein may employ a KNN model for both of the two spaces (e.g., the query space 202 and the document space 204). For instance, the system 100 of FIG. 1 may find the similar queries $N_q$ and the similar documents $N_d$, calculate the basic matching scores r(q',d') for q'∈$N_q$ and d'∈$N_d$, and conduct a weighted combination for r(q',d').

The systems and/or methods described herein may also be considered as a weighted KNN model in some metric space, which takes the query-document pairs as elements: (q,d)∈Q× D, where Q and D denote the query space 202 and document space 204, respectively. As shown in FIG. 2, given the similarity functions $s_Q$ and $s_D$, which may be respectively defined upon query space Q and document space D, the techniques described herein may actually find the nearest neighbors in these two spaces according to $s_Q$ and $s_D$. Furthermore, the matching between queries 124 and the corresponding documents may also be mapped into the query-document pair space as an element. By further defining the similarity function upon Q×D as $s_{Q \times D}((q,d),(q',d'))=s_Q(q,q')s_D(d,d')$, the re-ranking model may be written as shown in Equation 11:

$$f(q, d) = \alpha_0 r(q, d) + \sum_{(q',d') \in P} \alpha_{(q',d')} s_{Q \times D}((q, d), (q', d')) r(q', d'). \quad (11)$$

That is, the re-ranking model may be a weighted KNN model in Q×D.

Figure 4:
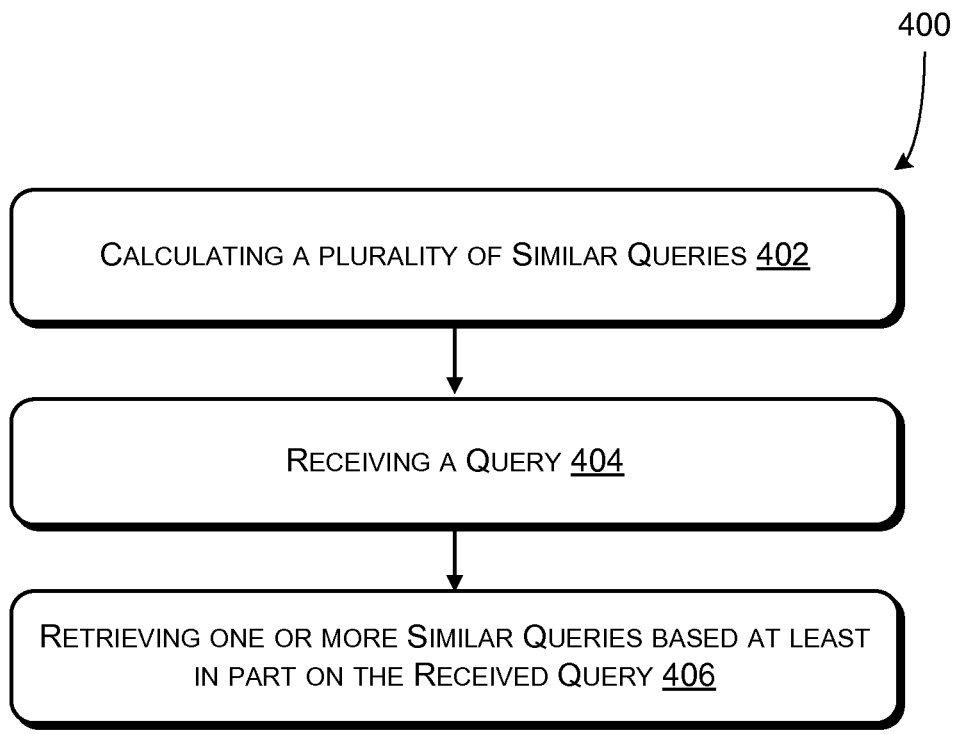
FIG. 4 illustrates a flowchart showing an illustrative process to determine one or more similar queries based on a search query.

FIGS. 3 and 4 describe various example processes for generating search results based at least in part on a search query and one or more similar search queries. The example processes are described in the context of the environment of FIGS. 1 and 2, but are not limited to those environments. The order in which the operations are described in each example process is not intended to be construed as a limitation, and any number of the described blocks can be combined in any order and/or in parallel to implement each process. Moreover, the blocks in the FIGS. 3 and 4 may be operations that can be implemented in hardware, software, and a combination thereof. In the context of software, the blocks represent computer-executable instructions that, when executed by one or more processors, cause one or more processors to perform the recited operations. Generally, the computer-executable instructions may include routines, programs, objects, components, data structures, and the like that cause the particular functions to be performed or particular abstract data types to be implemented.

FIG. 3 is a flowchart illustrating a process 300 of generating search results based on a search query and one or more similar queries. More particularly, block 302 illustrates receiving a query. In various embodiments the query may correspond to search query 124 and the query may be sent from user 102. Moreover, the query may be received by the online module 106, and in particular, the similar query finder 110. The query may include one or more terms and may have a search intent relating to identifying a particular type of information. For instance, the query may include the term "New York" and, therefore, may be requesting information about things to do in the city New York.

Block 304 illustrates identifying one or more similar queries. In various embodiments, the one or more similar queries may correspond to similar queries 126. Moreover, the similar query finder 110 may identify the one or more similar queries by locating them in the similar query repository 116. In addition, the one or more similar queries may be calculated by the query similarity calculator 118 based at least in part on the click-through data 120. How the one or more similar queries are calculated is discussed in additional detail with respect to FIGS. 1 and 4. Moreover, the one or more similar queries may include terms that are similar to, but are different from, the terms included in the query described above. Therefore, the one or more similar queries may have a different search intent than the previously submitted query.

Block 306 illustrates retrieving information corresponding to the query and to the similar queries. In an example embodiment, the similar query finder 110 may transmit the query and the one or more similar queries to the retrieval interface 112, as shown in FIG. 1. The retrieval interface 112 may then issue the query and the one or more queries to the index 122, which may store a plurality of information, such as, for example, URLs and/or web documents. In response, the retrieval interface 112 may identify information that is responsive and/or relevant to the query and to each of the one or more similar queries. This information may correspond to the search results 128, as illustrated in FIG. 1. For instance, if the query and the one or more queries relate to "New York," the search results 128 may include information about things to do in New York.

Block 308 illustrates ranking the information associated with the query and the similar queries. As stated above, the retrieval interface 112 may identify and/or retrieve information responsive and/or relevant to the query and to each of the similar queries. In addition, the retrieval interface 112 may rank the information based on their relevance to their respective query and/or similar query. That is, information corresponding to the query may be ranked, information corresponding to a first similar query may be ranked, information corresponding to a second similar query may be ranked, and so on. In various embodiments, the ranking may be performed by a ranking model.

In other embodiments, the information (i.e., documents) associated with the query and the similar queries need not be ranked. Instead, relevance scores may be calculated for each of the documents based at least in part on the queries that retrieved those particular documents. The relevance scores may correspond to a relevance and/or a responsiveness of the retrieved documents to the queries associated with those documents. For instance, documents that are more relevant and/or responsive to a particular query may be ranked higher than documents that are less relevant and/or responsive to that particular query. In some embodiments, the relevance scores may be subsequently utilized to combine and re-rank the documents/information.

Block 310 illustrates combining the information associated with the query and the similar queries into a set of query results. That is, the retrieval interface 112 may take all the ranked information associated with the query and each similar query and combine the information into a single set of search results, such as search results 128. Therefore, the set of search results may include information relevant and/or responsive to the query and to each of the similar queries. In addition, if the information associated with the query and the information associated with any of the similar queries includes duplicative information, such information may be removed when this information is combined.

Block 312 illustrates re-ranking the set of query results to create a set of re-ranked query results. In one embodiment, once the retrieval interface 112 has ranked and combined the information associated with the query and each of the similar queries, the retrieval interface 112 may then transmit the set of query results to the re-ranker 114. The re-ranker 114 may then re-rank the query results based on their respective relevance and/or responsiveness to the originally submitted query, which may be referred to as the re-ranked search results 130. The re-ranker may utilize a linear combination model and/or a KNN method to re-rank the set of query results. In one embodiment, the linear combination model may determine a relevance between the information retrieved from the query and the information retrieved from the one or more similar queries. In addition, the KNN method may utilize a query space and/or a document space, as shown in FIG. 2.

Therefore, the set of re-ranked search results may include a plurality of information relating to the original query. Since the set of re-ranked search results may include information relevant and/or responsive to the query, as well as each of the similar queries, the set of re-ranked query results may include additional documents that would not have been retrieved solely based on the original query. That is, the set of re-ranked query results may provide more relevant and responsive information to a user, such as user 102.

FIG. 4 is a flowchart illustrating a process 400 of identifying one or more similar queries based at least in part on a submitted query. In particular, block 402 illustrates calculating a plurality of similar queries. In various embodiments, the similar queries may correspond to similar queries 126, as shown in FIG. 1. In these embodiments, the similar queries may be determined by the query similarity calculator 118 and may be generated using any technique known in the art. For instance, the similar queries may be calculated based at least in part on the click-through data 120 and/or a search intent corresponding to the query. The click-through data 120 may be based on user actuation or selection of query results associated with previously submitted queries. Therefore, the click-through data 120 may represent implicit feedback relating to the relevance of information associated with a particular query. Once the similar queries are calculated, the similar queries may be merged and stored in a repository, such as the similar query repository 116, for example. Moreover, the similar query may be transmitted to the retrieval interface 112 with the query 124 by the similar query finder 110.

Block 404 illustrates receiving a query. As stated above, the query may correspond to search query 124, as illustrated in FIG. 1. Moreover, the query may be received from the user 102 by way of the online module 106. In response to receiving the query, the similar query finder 110 may identify queries that are similar (i.e., similar queries 126) to the query. In one embodiment, the similar queries 126 may be identified by comparing a search intent of the query and search intents of each of the similar queries 126. If the search intents are similar, the identified query may be considered a similar query 126.

Block 406 illustrates retrieving one or more similar queries based at least in part on the received query. In various embodiments, the retrieving may be performed by the similar query finder 110, as shown in FIG. 1. As stated above with respect to FIG. 1, the repository (e.g., similar query repository 116) may include a plurality of queries that may be similar (i.e., similar queries 126) to the previously submitted query (i.e., search query 124). In some embodiments, one or more similar queries may be identified and retrieved based at least in part on a search intent of the received query. More particularly, the similar query finder 110 may identify similar queries in the similar query repository 116 that are relevant to the received query and then retrieve those similar queries. Further, the similar queries may be identified and retrieved based at least in part on a search intent of the received query and a search intent of each of the stored similar queries. As mentioned previously, both the query and the similar queries may then be transmitted to the retrieval interface 112.

Figure 5:
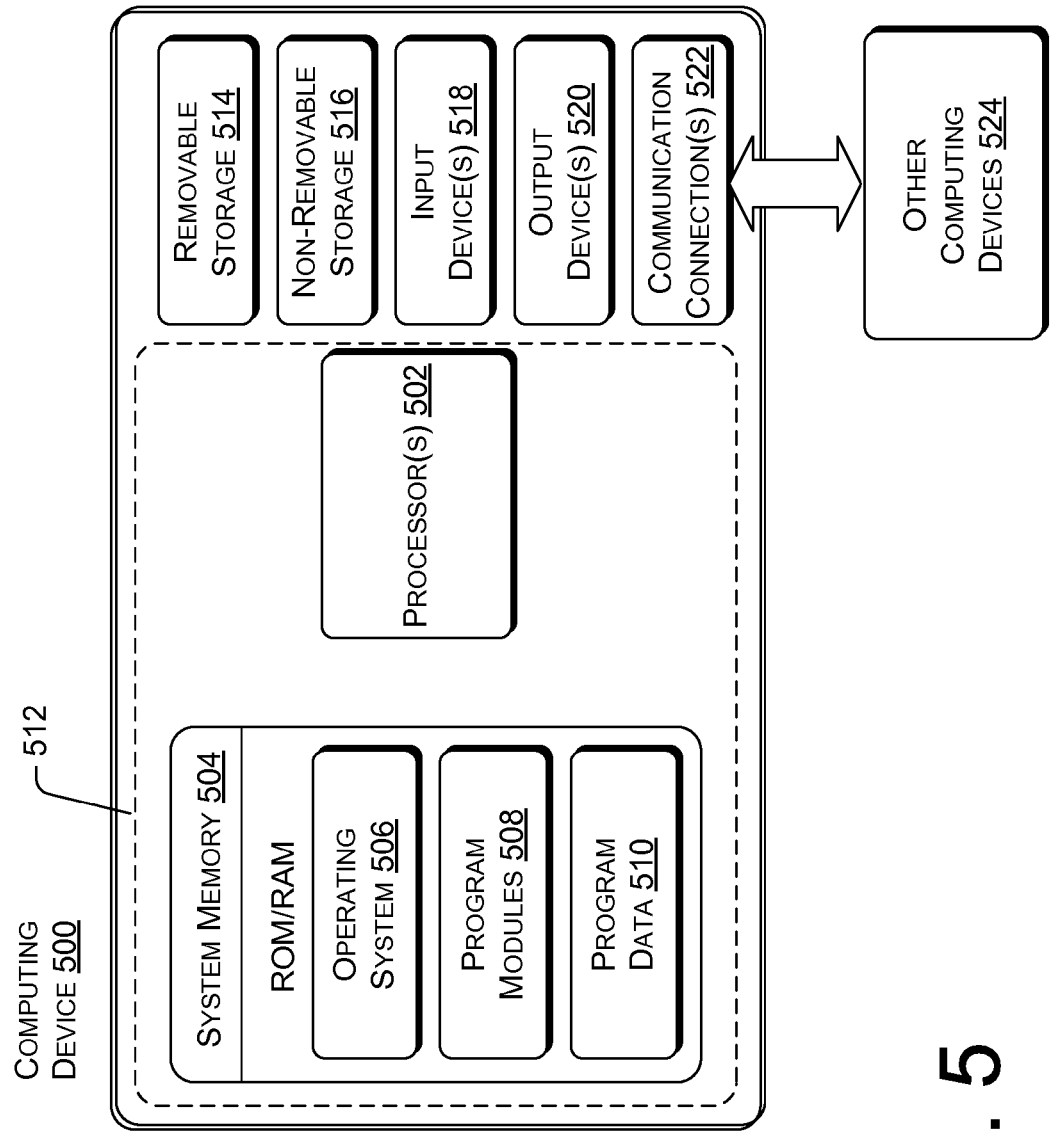
FIG. 5 is a block diagram that illustrates a representative computing device that may implement the query expansion methods described herein, in accordance with various embodiments.

FIG. 5 illustrates a representative computing device 104 that may implement the information retrieval techniques described herein, in accordance with various embodiments. The techniques and mechanisms described herein may be implemented by multiple instances of computing device 104 as well as by any other computing device, system, and/or environment. The computing device 104 shown in FIG. 5 is only one example of a computing device and is not intended to suggest any limitation as to the scope of use or functionality of any computing device utilized to perform the processes and/or procedures described above.

In at least one configuration, the computing device 104 includes at least one processor 502 and system memory 504. The processor(s) 502 may execute one or more modules and/or processes to cause the computing device 104 to perform a variety of functions. In some embodiments, the processor(s) 502 are a CPU, a GPU, both CPU and GPU, or other processing units or components known in the art. Additionally, each of the processor(s) 502 may possess its own local memory, which also may store program modules, program data, and/or one or more operating systems.

Depending on the exact configuration and type of the computing device 104, the system memory 504 may be volatile (such as RAM), non-volatile (such as ROM, flash memory, miniature hard drive, memory card, or the like) or some combination thereof. The system memory 504 may include an operating system 506, one or more program modules 508, and may include program data 510. The computing device 104 is of a very basic configuration demarcated by a dashed line 512. Again, a terminal may have fewer components but may interact with a computing device that may have such a basic configuration.

The computing device 104 may have additional features and/or functionality. For example, the computing device 104 may also include additional data storage devices (removable and/or non-removable) such as, for example, magnetic disks, optical disks, or tape. Such additional storage is illustrated in FIG. 5 by removable storage 514 and non-removable storage 516. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. The system memory 504, the removable storage 514 and the non-removable storage 516 are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other non-transmission medium that can be used to store the desired information and which can be accessed by the computing device 104. Any such computer storage media may be part of the computing device 104. Moreover, the computer-readable media may include computer-executable instructions that, when executed by the processor(s) 502, perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The computing device 104 may also have input device(s) 518 such as a keyboard, a mouse, a pen, a voice input device, a touch input device, etc. Output device(s) 520, such as a display, speakers, a printer, etc. may also be included. The user 102, as shown in FIG. 1, may utilize the foregoing features to interact with the computing device 104. For instance, the computing device 104 may be used to enter one or more terms and/or queries into a web search engine.

The computing device 104 may also contain communication connections 522 that allow the device to communicate with other computing devices 524, such as over a network. These networks may include wired networks as well as wireless networks. The communication connections 522 are some examples of communication media, as described above.

It is appreciated that the illustrated computing device 104 is only one example of a suitable device and is not intended to suggest any limitation as to the scope of use or functionality of the various embodiments described. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The computing device 104 may also include the online module 104 and the offline module 108, as shown in FIG. 1. The online module 104 may include the similar query finder 110, the retrieval interface 112, and/or the re-ranker 114. Moreover, the offline module 108 may include the similar query repository 116, the query similarity calculator 118, the click-through data 120, and/or the index 122.

The implementation and administration of a shared resource computing environment on a single computing device may enable multiple computer users to concurrently collaborate on the same computing task or share in the same computing experience without reliance on networking hardware such as, but not limited to, network interface cards, hubs, routers, servers, bridges, switches, and other components commonly associated with communications over the Internet, as well without reliance on the software applications and protocols for communication over the Internet.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A method comprising:
receiving a query that includes one or more terms, the query being associated with first resource identifiers, and the first resource identifiers being associated with first click-through data and ranking scores;
identifying a similar query including a set of terms different from the one or more terms, the similar query being associated with second resource identifiers and the second resource identifiers being associated with second click-through data;
determining a query similarity score between the query and the similar query, the query similarity score being based at least in part on a correlation between the first click-through data and the second click-through data;
identifying a resource identifier of the second resource identifiers that is not included in the first resource identifiers;
determining a ranking score between the resource identifier and the similar query;
determining a combined ranking score associated with the resource identifier based on the ranking score and the query similarity score; and
combining the resource identifier with the first resource identifiers to generate a set of query results, the set of query results being ranked based at least in part on the combined ranking score associated with the resource identifier and the ranking scores associated with the first resource identifiers.

2. The method as recited in claim 1, further comprising identifying the similar query from a similar query repository.

3. The method as recited in claim 1, wherein the combined ranking score associated with the resource identifier is determined according to a linear combination model that determines a relevance between the first resource identifiers and the resource identifier.

4. The method as recited in claim 1, wherein the set of query results includes a plurality of web documents or URLs.

5. The method as recited in claim 1, further comprising retrieving the ranking scores and the ranking score by issuing the query and the similar query to an index that stores a plurality of information.

6. The method as recited in claim 1, wherein the query similarity score is determined based at least in part on a comparison between a search intent of the query and a search intent for the similar query.

7. A computer-readable storage medium including computer-executable instructions that, when executed by a processor, perform operations comprising:
receiving a query requesting information relevant to the query;
identifying one or more queries similar to the query when the one or more similar queries are stored in a repository;
calculating the one or more similar queries, wherein the calculating comprises determining a Pearson correlation based on click-through information of resource identifiers of the query and the one or more queries to determine a number of shared resource identifiers that corresponds to both the query and the one or more queries when the one or more similar queries are not stored in the repository; and providing a combined list of ranked information corresponding to the query and to the one or more similar queries.

8. The computer-readable storage medium as recited in claim 7, wherein the click-through information is based at least in part on user interaction with query results associated with previously submitted queries.

9. The computer-readable storage medium as recited in claim 7, further comprising:
retrieving information associated with the query;
retrieving information associated with individual ones of the one or more queries;
combining the information associated with the query and the information associated with individual ones of the one or more queries into a set of combined query results; and
ranking the combined query results based at least in part on a relevance to the query.

10. The computer-readable storage medium as recited in claim 9, wherein the combining and the ranking are performed using a k-nearest neighbor model that utilizes a query space and a document space.

11. The computer-readable storage medium as recited in claim 9, wherein the combining includes removing duplicative information from the information associated with the query and the information associated with the one or more queries.

12. The computer-readable storage medium as recited in claim 7, wherein the set of combined query results includes information that would not have been otherwise retrieved solely in response to the query.

13. A system comprising:
a processor;
a memory comprising components that are executed by the processor, the components comprising:
a similar query finder to receive a query and retrieve one or more queries similar to the query;
a query similarity calculator to calculate the one or more similar queries based at least in part on a Pearson correlation based on click-through data, wherein the one or more queries are determined to be similar to the query when the Pearson correlation is above a threshold;
a retrieval interface to:
retrieve information responsive to the query and to the one or more similar queries;
rank the information into a set of search results; and
re-rank the set of search results based at least in part on the query; and
a re-ranker configured to re-rank the set of search results into a set of re-ranked search results based at least in part on a relevance to the query.

14. The system as recited in claim 13, wherein the query similarity calculator creates a similar query repository to store the one or more similar queries.

15. The system as recited in claim 13, further comprising:
an online module that includes the similar query finder, the retrieval interface, and the re-ranker; and
an offline module that includes the query similarity calculator, a similar query repository, the click-through data, and an index.

16. The system as recited in claim 15, wherein the online module is configured to return the re-ranked search results to a user that previously submitted the query.

17. The system as recited in claim 13, wherein the set of re-ranked search results includes information associated with at least one of the one or more similar queries that would not have been retrieved solely in response to the query.

18. The method as recited in claim 1, wherein the combined ranking score is determined based at least in part on a product of the ranking score and the query similarity score.

19. The method as recited in claim 1, further comprising:
identifying a shared resource identifier common to the first resource identifiers and the second resource identifiers;
determining a first ranking score between the query and the shared resource identifier
determining a second ranking score between the similar query and the shared resource identifier;
determining a similarity contribution based at least in part on the query similarity score and the second ranking score; and
determining a shared ranking score associated with the shared resource identifier based on the similarity contribution and the first ranking score.

20. The method as recited in claim 19, wherein the similarity contribution is determined based at least in part on a product of the query similarity score and the second ranking score and wherein the shared ranking score is determined based at least in part on a sum of the similarity contribution to the first ranking score.

* * * * *